US012153457B2

(12) United States Patent
Janaswamy et al.

(10) Patent No.: US 12,153,457 B2
(45) Date of Patent: Nov. 26, 2024

(54) CASCADED REFERENCE BASED THIN-OXIDE ONLY N-WELL STEERING CIRCUIT FOR CONTENTION SOLUTION IN MULTI-SUPPLY DESIGNS

(71) Applicant: XILINX, INC., San Jose, CA (US)

(72) Inventors: Lakshmi Venkata Satya Lalitha Indumathi Janaswamy, Hyderabad (IN); Sree Rama Krishna Chaithnya Saraswatula, Hyderabad (IN); Santosh Yachareni, Hyderabad (IN); Anil Kumar Kandala, Hyderabad (IN); Narendra Kumar Pulipati, Hyderabad (IN); Shidong Zhou, Hyderabad (IN)

(73) Assignee: XILINX, INC., San Jose, CA (US)

( * ) Notice: Subject to any disclaimer, the term of this patent is extended or adjusted under 35 U.S.C. 154(b) by 22 days.

(21) Appl. No.: 18/137,387

(22) Filed: Apr. 20, 2023

(65) Prior Publication Data

US 2024/0353879 A1 Oct. 24, 2024

(51) Int. Cl.
*G05F 1/46* (2006.01)
*G05F 1/56* (2006.01)

(52) U.S. Cl.
CPC .............. *G05F 1/465* (2013.01); *G05F 1/562* (2013.01)

(58) Field of Classification Search
None
See application file for complete search history.

(56) References Cited

U.S. PATENT DOCUMENTS 5,689,209 A * 11/1997 Williams .............. H02J 7/0031 327/425
6,191,615 B1 * 2/2001 Koga ................. H03K 19/0013 326/83
6,377,112 B1 4/2002 Rozsypal
8,283,968 B2 * 10/2012 Ramet .................. H03K 17/063 327/434

* cited by examiner

*Primary Examiner* — Jeffrey S Zweizig
(74) *Attorney, Agent, or Firm* — Patterson + Sheridan, LLP

(57) ABSTRACT

A cascaded thin-oxide N-Well voltage steering circuit includes a reference voltage generator that outputs a reference voltage within a range of first and second supply voltages, a first voltage steering circuit that outputs a higher available one of the reference voltage and the second supply voltage as an interim voltage, and a second voltage steering circuit that outputs a higher available one of the first voltage and the interim voltage at an output of the second voltage steering circuit. The interim voltage is applied to N-wells of PMOS transistors of the first voltage steering circuit. The output of the second voltage steering circuit is applied to N-wells of PMOS transistors of the second voltage steering circuit. The output of the second voltage steering circuit may also be applied to N-wells of PMOS transistors of other circuitry. The cascaded thin-oxide N-Well voltage steering circuit may consist substantially of thin-oxide PMOS transistors.

20 Claims, 7 Drawing Sheets

CASCADED REFERENCE BASED THIN-OXIDE ONLY N-WELL STEERING CIRCUIT FOR CONTENTION SOLUTION IN MULTI-SUPPLY DESIGNS

TECHNICAL FIELD

Examples of the present disclosure generally relate to a cascaded reference based thin-oxide only N-WELL steering circuit for contention solution in multi-supply designs.

BACKGROUND

To avoid forward biasing P-type metal-oxide semiconductor (PMOS) transistors of an integrated circuit (IC) device, N-wells of the PMOS transistors may be coupled to a supply voltage of the IC device. Where the IC device includes multiple supply voltages (e.g., to accommodate a combination of thick-oxide devices and thin-oxide devices), a highest available one of the supply voltages may be applied to the N-wells of the PMOS transistors. As the IC device is powered up, however, a lower supply voltage may become available before the highest supply voltage is available, which may lead to an over-voltage condition. The IC device may thus further include an N-well voltage steering circuit that dynamically selects a highest available one of the supply voltages to provide to the N-wells of the PMOS transistors of the IC device, including PMOS transistors of the N-well steering circuit.

Challenges arise as the industry transitions to thin-oxide-only circuits. For example, conventional N-well voltage steering circuits include thick-oxide PMOS transistors. The thick-oxide PMOS transistors of a conventional N-well voltage steering circuit cannot simply be replaced with thin-oxide PMOS transistors because the higher supply voltage may lead to over-voltage conditions in the thin-oxide PMOS transistors of the conventional N-well voltage steering circuit.

SUMMARY

Techniques for a cascaded reference based thin-oxide only N-WELL steering circuit for contention solution in multi-supply designs are described.

One example is an integrated circuit (IC) device that includes a voltage divider circuit that outputs a reference voltage based on a first supply voltage, a first voltage steering circuit that outputs a higher available one of the reference voltage and a second supply voltage as an interim voltage, and a second voltage steering circuit that outputs a higher available one of the first voltage and the interim voltage at an output of the second voltage steering circuit.

The first and second voltage steering circuits may include P-type metal oxide semiconductor (PMOS) transistors. The output of the first voltage steering circuit may be coupled to N-wells of the PMOS transistors of the first voltage steering circuit, and the output of the second voltage steering circuit may be coupled to N-wells of the PMOS transistors of the second voltage steering circuit. Where the IC device further includes functional circuitry, the output of the second voltage steering circuit may be coupled to N-wells of PMOS transistors of the functional circuitry. The PMOS transistors may consist substantially of thin-oxide PMOS transistors.

Another example is an IC) device that includes a cascaded N-well voltage steering circuit that has first and second inputs coupled to respective sources of first and second supply voltages, and PMOS transistors consisting substantially of thin-oxide PMOS transistors arranged to output a highest available one of the first and second supply voltages at an output of the cascaded N-well voltage steering circuit.

Another example is an IC device that includes a voltage divider circuit that has input coupled to a source of a first supply voltage, and a reference voltage output. The IC device further includes a first voltage steering circuit having a reference voltage input coupled to the reference voltage output of the voltage divider circuit, and a second supply voltage input coupled to a source of a second supply voltage. The first voltage steering circuit outputs a highest one of a voltage at the first input and a voltage at the second input at an interim voltage output. The IC device further includes a second voltage steering circuit having a first supply voltage input coupled to the source of the first supply voltage, and an interim voltage input coupled to the interim voltage output of the first voltage steering circuit. The second voltage steering circuit outputs a highest one of a voltage at the first supply voltage input and a voltage at the interim voltage input at an output of the second voltage steering circuit.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
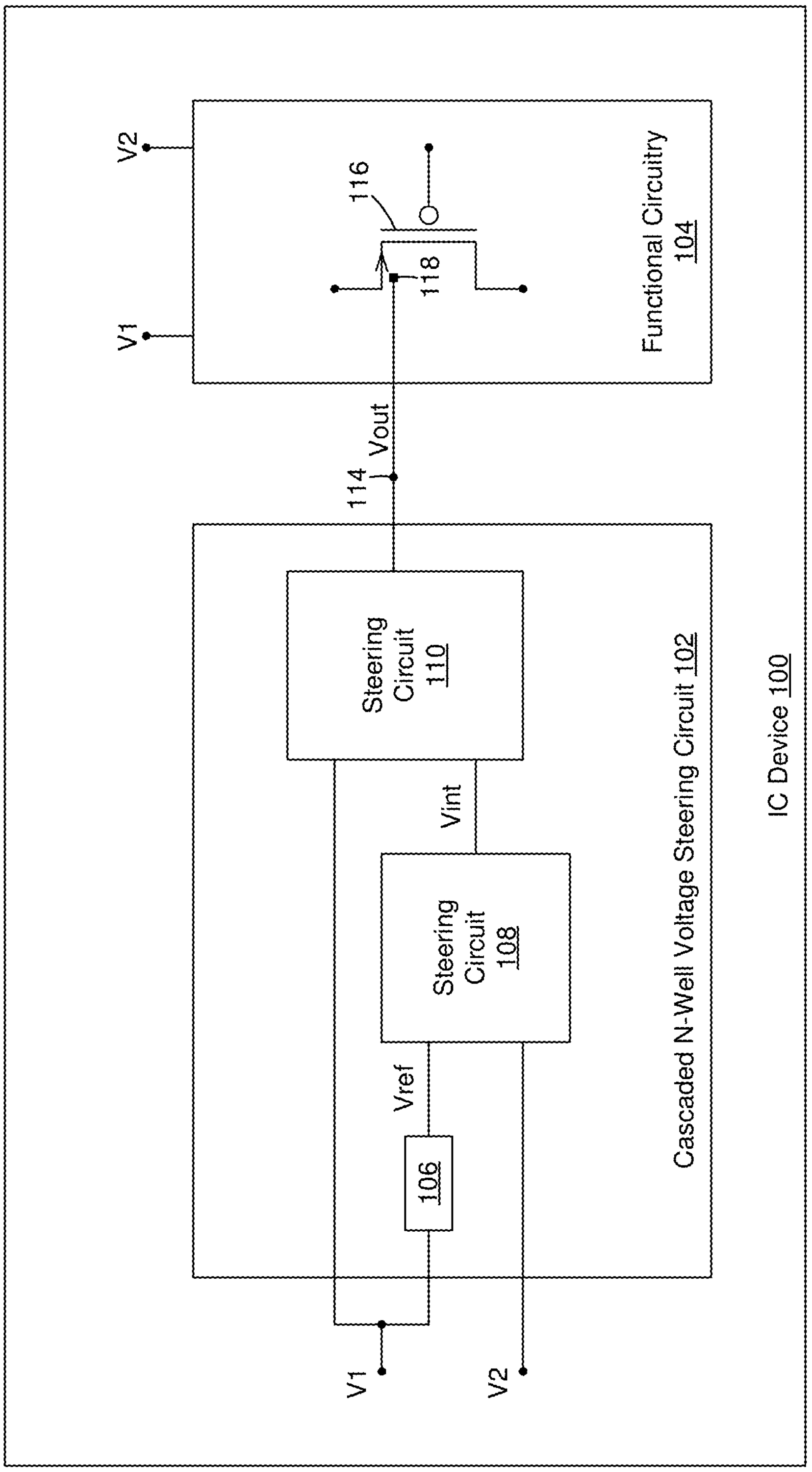
FIG. 1 is a block diagram of an IC device that includes a thin-oxide cascaded N-well voltage steering circuit that steers a highest available supply voltage to functional circuitry, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

In a metal-oxide-semiconductor field-effect transistor (MOSFET), gate oxide is a dielectric layer that separates a gate from a source and a drain, and from a conductive channel that connects the source and drain, when the MOSFET is turned on. As channel lengths scale down, supply voltage and gate oxide thickness also scale down. At shorter channel lengths, short channel effects (e.g., drain-induced barrier lowering, velocity saturation, quantum confinement, and hot carrier degradation) may arise. To keep the short channel effect under control, gate oxide thickness is reduced nearly in proportion to channel length. Reducing gate oxide thickness may render a circuit vulnerable to quantum-mechanical tunneling, which gives rise to gate leakage current. Gate oxide thickness varies with fabrication technology. The gate oxide thickness of transistors of an IC device may be listed in a technology document associated with the IC device.

A transistor may be denoted as a thick-oxide transistor or a thin-oxide transistor based on the gate oxide thickness of the transistor. Thick-oxide transistors operate on a supply in a range of 1.35 volts to 1.65 volts (e.g., 1.5 volts). Thin-oxide transistors operate on a supply in a range of 0.65 volts to 0.9 volts (e.g., 0.75V). Voltage spacing rules of thick-oxide transistors differ from voltage spacing rules of thin-oxide transistors. Thick-oxide transistors may be referred to as IO devices. Thin-oxide transistors may be referred to as core devices.

A transistor may experience an over-voltage condition when a junction voltage (i.e., a drain-to-source voltage (Vds), a gate-to-source voltage (Vgs), and a gate-to-drain voltage (Vgd)) of the transistor exceeds a maximum recommended/allowed junction voltage of the transistor. For a thin-oxide transistor, the maximum recommended/allowed junction voltage may be approximately 0.965 volts.

Semiconductor manufacturing processes are often referred to in terms of minimum channel length of transistors. The industry is currently moving towards 2 nanometer (nm) fabrication processes and beyond, which follows 3 nm, 5 nm, and 7 nm fabrication processes. Operating voltages and voltage swings become smaller with each subsequent fabrication process. In general, IC devices of earlier fabrication processes (i.e., 3 nm, 5 nm and 7 nm fabrication processes) are thick-oxide transistors or a combination of thick-oxide and thin-oxide transistors. IC devices of newer fabrication processes (i.e., 2 nm and beyond fabrication processes) include exclusively thin-oxide transistors (i.e., no thick-oxide devices).

Voltages and voltage swings of thick-oxide circuitry may cause an over-voltage condition in a thin-oxide based circuitry, which may stress the gate oxide layer of the thin-oxide transistor due to lower capacitance, and/or may narrow a depletion region of the thin-oxide transistor and lower a barrier to carrier injection. An over-voltage condition may also lead to stress induced leakage current, which may reduce the lifetime of the thin-oxide transistor. Thick-oxide PMOS transistors of a conventional voltage steering circuit thus cannot simply be replaced with thin-oxide PMOS transistors because higher supply voltages used for thick-oxide transistors may lead to over-voltage conditions in thin-oxide transistors.

Embodiments herein describe a cascaded reference-based thin-oxide only N-well steering circuit for contention solution in multi-supply designs. A cascaded N-well voltage steering circuit, as disclosed herein, provides a highest available supply voltage to N-wells of PMOS transistors, while preventing forward bias between source and bulk nodes of the PMOS transistors, using thin-oxide transistors. A cascaded N-well voltage steering circuit, as disclosed herein, may be useful to implement an N-well voltage steering circuit using only thin-oxide transistor, which may reduce design costs and power consumption.

FIG. 1 is a block diagram of an IC device 100 that includes a thin-oxide cascaded N-well voltage steering circuit 102 that steers a highest available one of first and second supply voltages, V1 and V2, to an output 114, according to an embodiment. In examples presented below, supply voltage V1 is higher than supply voltage V2. Supply voltage V1 may represent a supply voltage for thick-oxide transistors. Supply voltage V2 may represent a supply voltage for thin-oxide transistors.

In FIG. 1, cascaded N-well voltage steering circuit 102 includes a reference voltage generator circuit 106, and first and second voltage steering circuits 108 and 110.

Reference voltage generator circuit 106 generates a reference voltage, Vref, based on supply voltage V1. When supply voltage V1 is available (e.g., on, or powered-up), reference voltage generator circuit 106 generates reference voltage Vref to be within ranges of supply voltages V1 and V2 to avoid over-voltage conditions in thin-oxide transistors of first voltage steering circuit 108. When V1 is not available, reference voltage Vref may be at the reference level (e.g., ground).

First voltage steering circuit 108 provides a highest available one of Vref and supply voltage V2 as an interim voltage, Vint. Second voltage steering circuit 110 provides a highest available one of Vint and supply voltage V1 as an output voltage, Vout. In other words, cascaded N-well voltage steering circuit 102 outputs supply voltage V1 when supply voltage V1 is available, and outputs supply voltage V2 when supply voltage of V2 is available and supply voltage V1 is available. Interim voltage Vint may be applied to N-wells of PMOS transistors within first voltage steering circuit 108 and output voltage Vout may be applied to N-wells of PMOS transistors within second voltage steering circuit 110 to prevent forward biasing of the respective PMOS.

Table 1 below provides a summary of states of cascaded N-well voltage steering circuit 102 for various combinations of states of supply voltages V1 and V2.

TABLE 1

| V1 | V2 | Vref | Vref, V2 | Vint | Vint, V1 | Vout |
|---|---|---|---|---|---|---|
| On | Off | On | Vref > V2 | Vref | Vref < V1 | V1 |
| On | On | On | Vref > V2 | V1 < Vref < V2 | Vref < V1 | V1 |
| Off | On | Off | Vref < V2 | V2 | Vref > V1 | V2 |

Voltage levels of supply voltage V2 and Vref (and thus Vint) are such that they will not cause an over voltage condition in thin-oxide transistors of first voltage steering circuit 108. Voltage levels of supply voltage V1 and Vint (i.e., Vref or V2) are such that they will not cause an over voltage condition in thin-oxide transistors of second voltage steering circuit 110.

As an example, and without limitation, supply voltage V1 may be within a range of approximately 1.35 to 1.65 volts, supply voltage V2 may be within a range of approximately 0.65 to 0.9 volts. In this example. Vref may be less than supply voltage V1 but greater than a difference between supply voltage V1 and the maximum recommended/allowed junction voltage of thin-oxide transistors. Where the maximum recommended/allowed junction voltage is 0.966, for example, Vref>(V1−0.965 volts). In an embodiment, Vref=½V1 (e.g., approximately 0.825 volts). Cascaded N-well voltage steering circuit 102 is not, however, limited to the foregoing examples.

In FIG. 1, IC device 100 further includes functional circuitry 104, illustrated here as including a PMOS transistor 116. In an embodiment, Vout is provided to an N-well, or bulk terminal 118 of PMOS transistor 116 and to N-wells of other PMOS transistors of functional circuitry 104. PMOS transistor 116 may be a thin-oxide PMOS transistor or a thick-oxide PMOS transistor. Other PMOS transistors of functional circuitry 104 may include a combination of thin-oxide and thick-oxide PMOS transistors.

Figure 2:
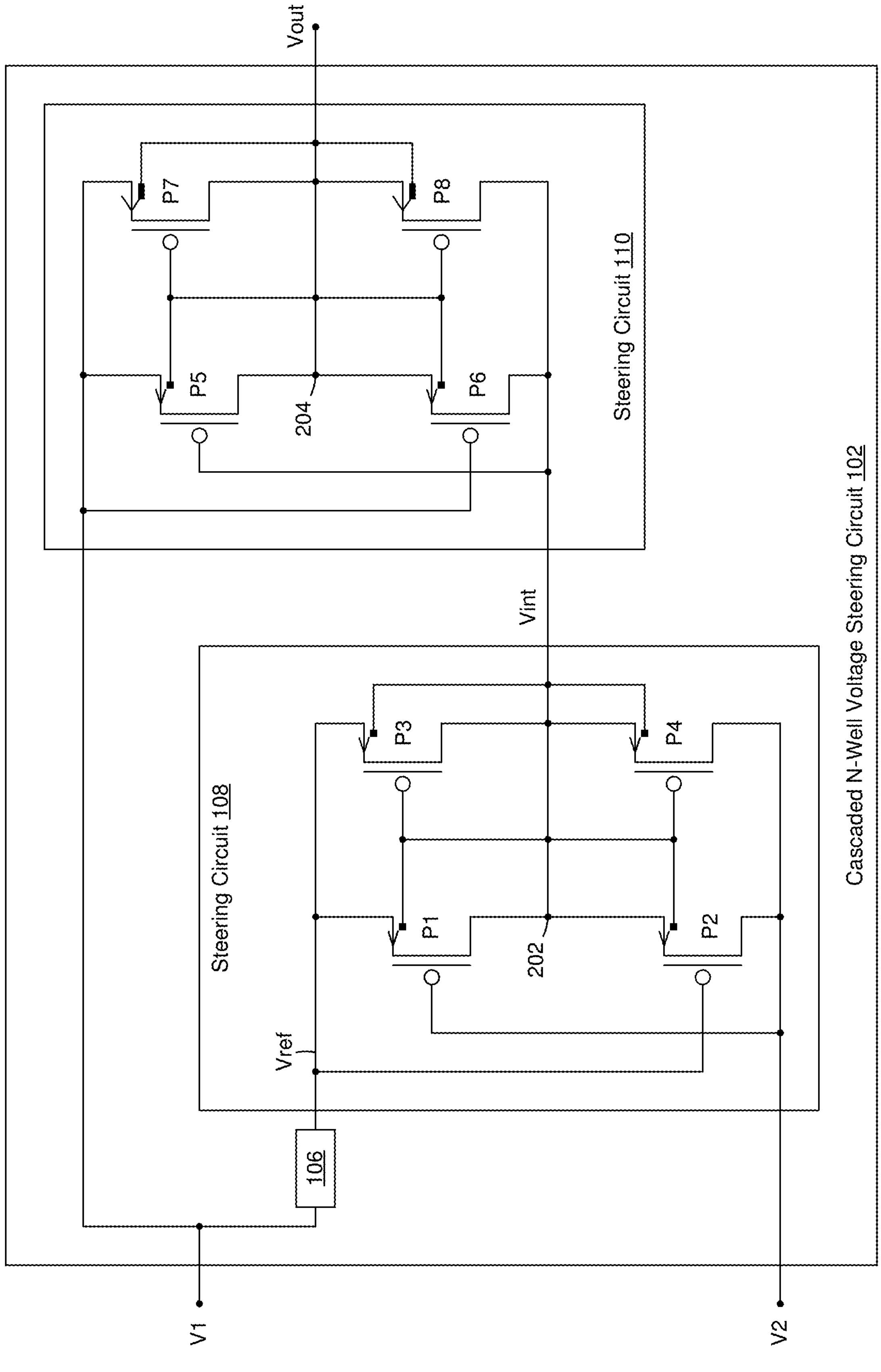
FIG. 2 illustrates a schematic diagram of the cascaded N-well voltage steering circuit, according to an embodiment.

FIG. 2 is a schematic diagram of cascaded N-well voltage steering circuit 102, according to an embodiment. In the example of FIG. 2, first voltage steering circuit 108 includes PMOS transistors P1, P2, P3, and P4. A gate of PMOS transistor P1 is controlled by supply voltage V2. A gate of PMOS transistor P2 is controlled by Vref. Gates of PMOS transistors P3 and P4 are controlled by Vint. Vint is also applied to N-well, or bulk terminals of PMOS transistors P1, P2, P3, and P4.

Second voltage steering circuit 110 includes PMOS transistors P5, P6, P7, and P8. A gate of PMOS transistor P5 is controlled by Vint. A gate of PMOS transistor P6 is controlled by supply voltage V1. Gates of PMOS transistors P7 and P8 are controlled by Vout. Vout is also applied to N-well, or bulk terminals of PMOS transistors P5, P6, P7, and P8.

In FIG. 2, interim voltage Vint is applied to N-wells of PMOS transistors P1. P2, P3, and P4 of first voltage steering circuit 108 to prevent forward biasing of PMOS transistors P1, P2, P3, and P4. Output voltage Vout is applied to N-wells of PMOS transistors P5, P6, P7, and P8 of second voltage steering circuit 110 to prevent forward biasing of PMOS transistors P5, P6, P7, and P8.

Example scenarios are described below in which supply voltage V1=1.65 volts, Vref=0.825 volts, and supply voltage V2=0.65 volts. Supply voltage V1 is thus at its maximum allowable voltage, and supply voltage V2 is at its minimum allowable voltage. This may be referred to as a worst-case scenario with respect to the potential for an over-voltage condition. Cascaded N-well voltage steering circuit 102 is not limited to the foregoing examples.

Figure 3:
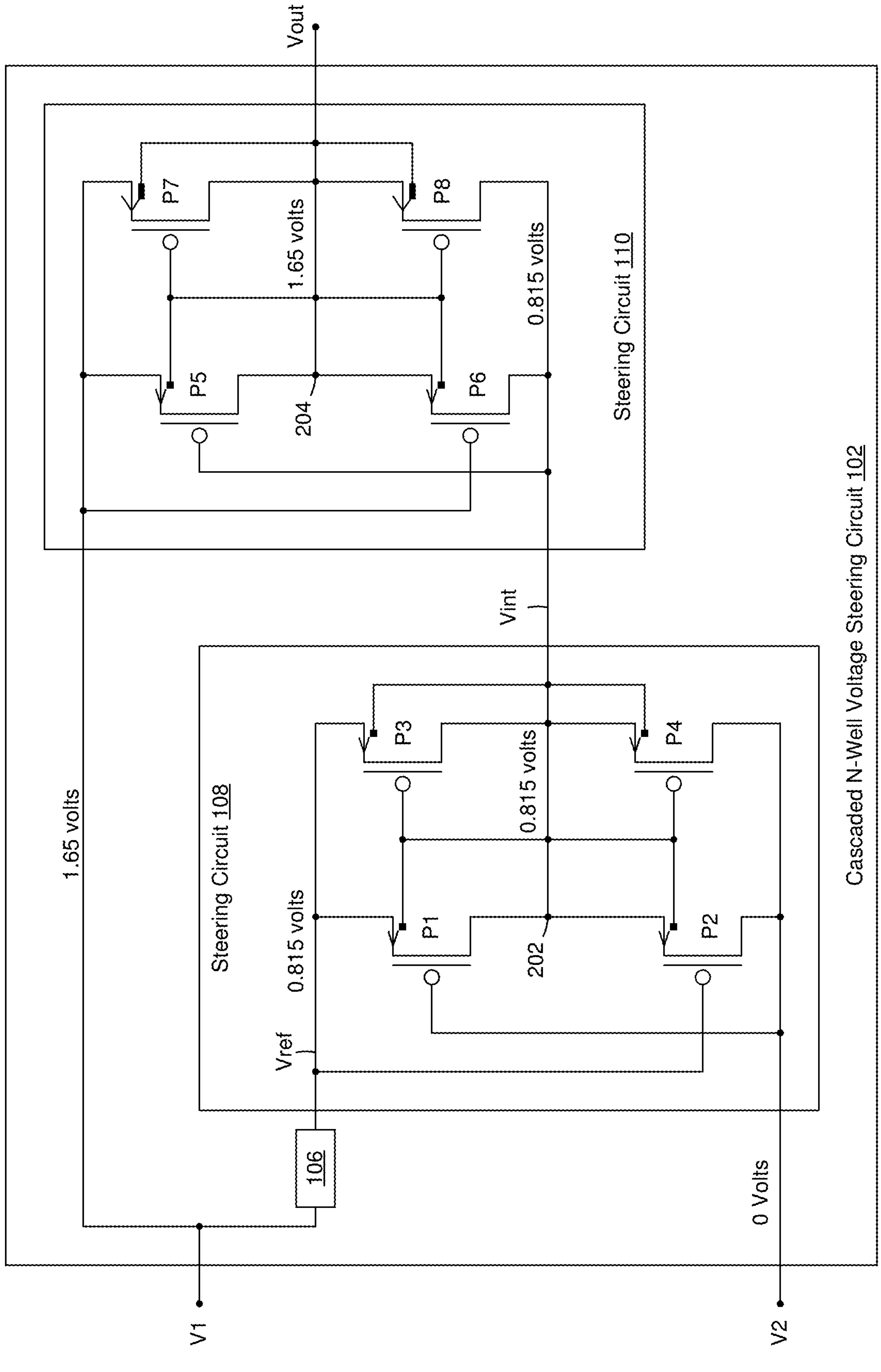
FIG. 3 illustrates the schematic diagram of FIG. 2 with example voltages for a situation in which a higher supply voltage is available prior to a lower supply voltage, according to an embodiment.
Figure 4:
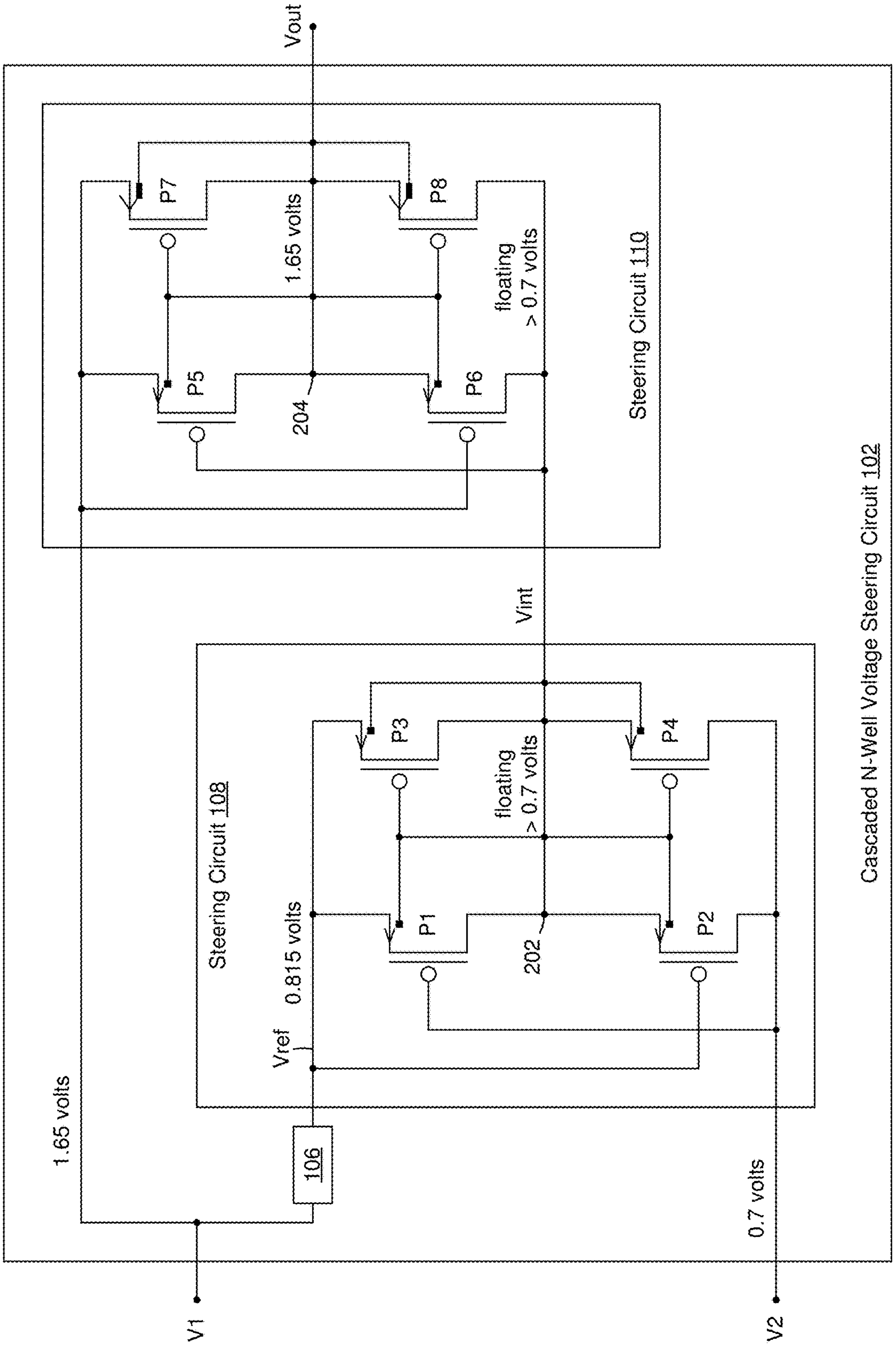
FIG. 4 illustrates the schematic diagram of FIG. 2 with example voltages for a situation in which lower and higher supply voltages are available, according to an embodiment.

In a first scenario, supply voltage V1 is available prior to supply voltage V2. The first scenario is described below with reference to FIGS. 3 and 4. FIG. 3 illustrates the schematic diagram of cascaded N-well voltage steering circuit 102 for a state in which V1=1.65 volts, Vref=0.825 volts, and V2=0, according to an embodiment. FIG. 4 illustrates the schematic diagram of cascaded N-well voltage steering circuit 102, for a state in which V1=1.65 volts, Vref=0.825 volts, and V2=0.7 volts, according to an embodiment.

In first voltage steering circuit 108 of FIG. 3, as Vref rises towards 0.825 volts, gate-to-source voltages (VGSs) of PMOS transistors P1 and P2 are such that PMOS transistor P2 is off (i.e., non-conducting), and PMOS transistor P1 turns on (i.e., conducting). In this state, a node 202 (i.e., Vint) is pulled up towards Vref (i.e., towards 0.825 volts), through PMOS transistor P1, and PMOS transistors P3 and P4 are in nonconductive, or off states.

In second voltage steering circuit 110 of FIG. 3, as Vint rises towards 0.825 volts, VGSs of PMOS transistors P5 and P6 are such that PMOS transistor P5 is on and PMOS transistor P6 is off. In this state, a node 204 (i.e., Vout) is pulled up towards V1 (i.e., towards 1.65 volts), through PMOS transistor P5, and PMOS transistors P7 and P8 are in nonconductive, or off states.

In the first scenario described above, junction voltages of PMOS transistors P1 through P8 do not exceed a maximum recommended/allowed junction voltage of thin-oxide PMOS transistors. PMOS transistors P1 through P8 may thus be fabricated as thin-oxide transistors.

Figure 5:
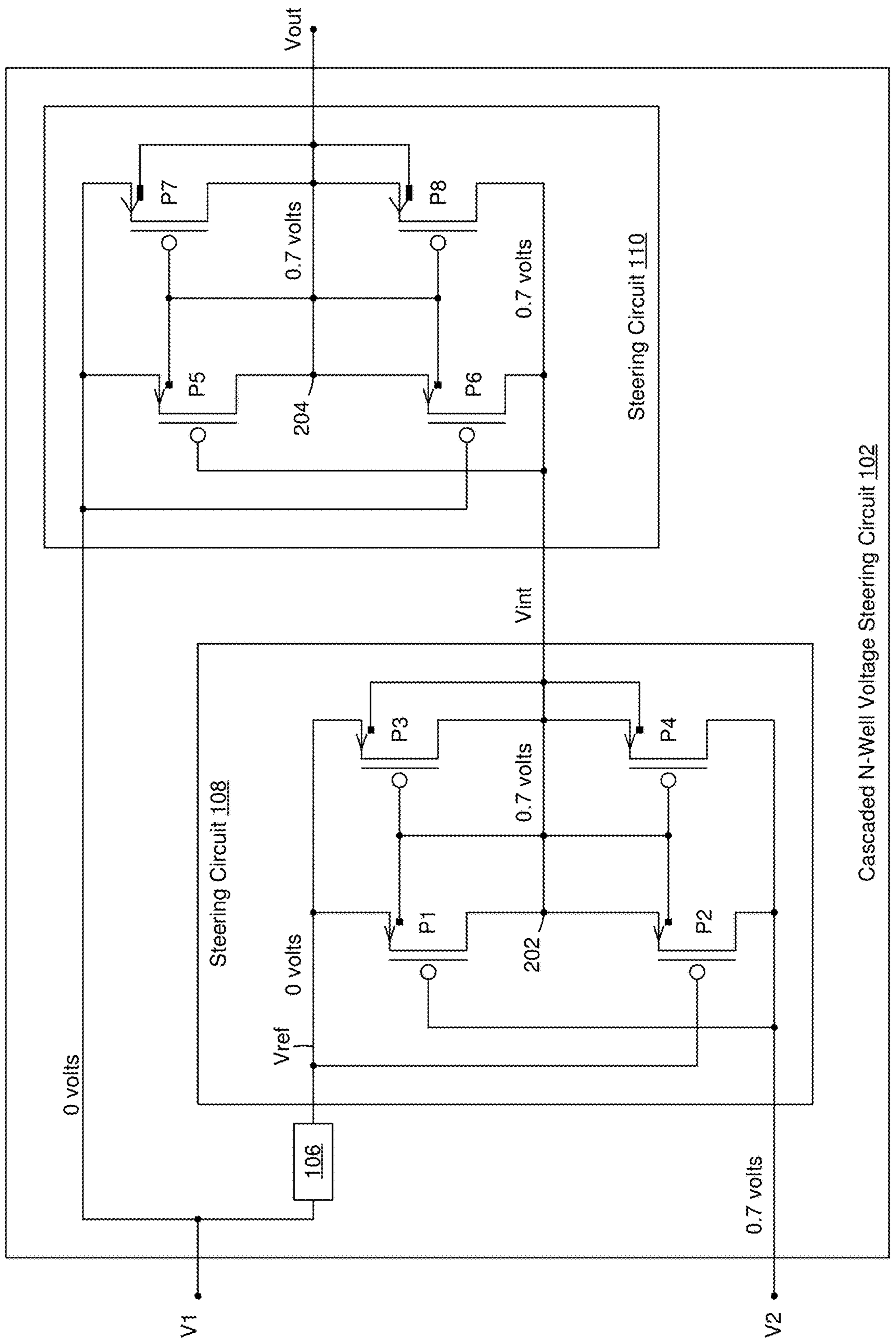
FIG. 5 illustrates the schematic diagram of FIG. 2 with example voltages for a situation in which a lower supply voltage is available prior to a higher supply voltage, according to an embodiment.
Figure 6:
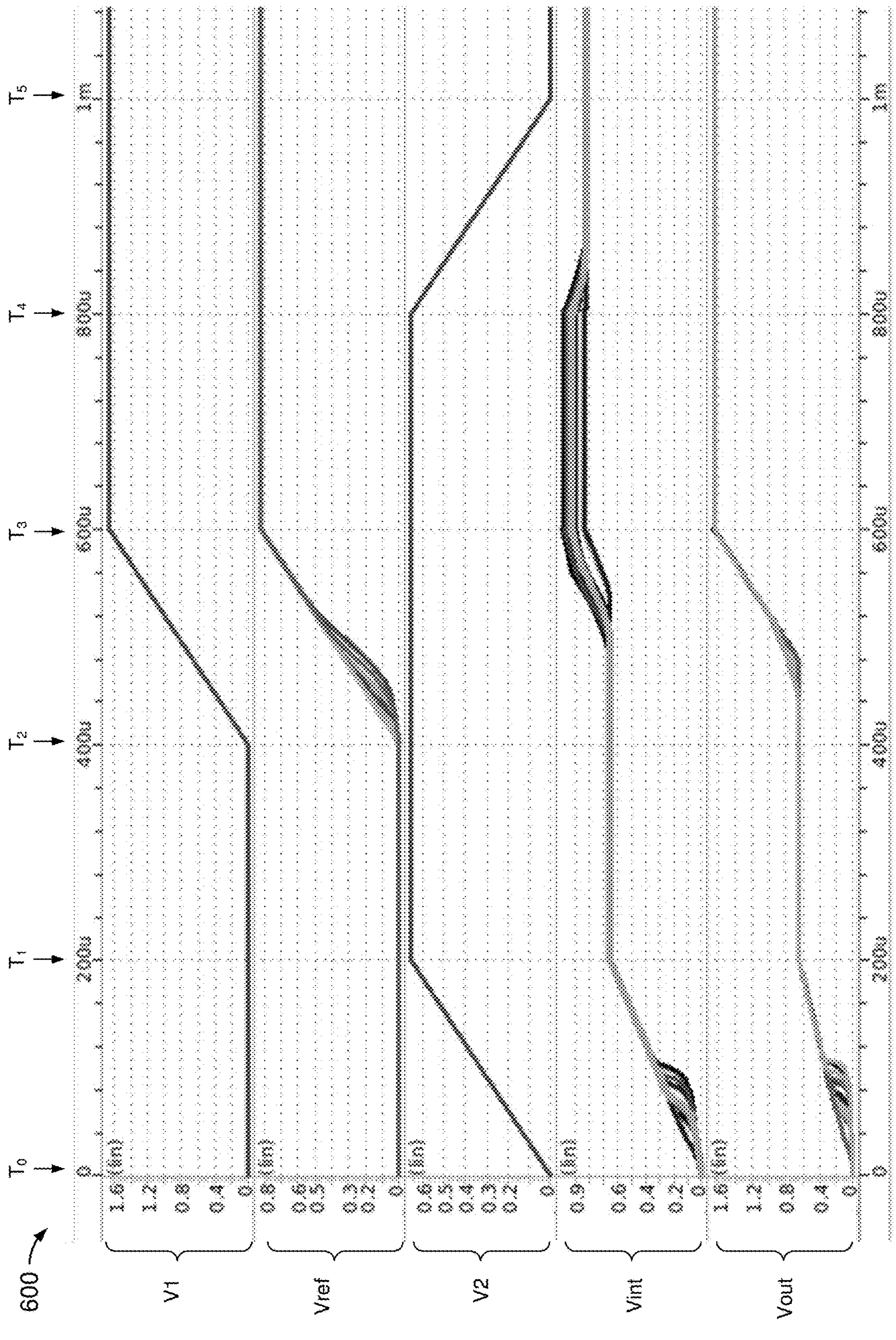
FIG. 6 illustrates a timing diagram for the example of FIG. 7, according to an embodiment.

In a second scenario, V2 is available prior to V1. The second scenario is described below with reference to FIGS. 4, 5, and 6. FIG. 5 illustrates the schematic diagram of cascaded N-well voltage steering circuit 102, for a state in which V1=Vref=0 volts, and V2=0.7 volts, according to an embodiment. FIG. 6 illustrates a timing diagram 600 for the second scenario, according to an embodiment.

In FIG. 6, between times $T_0$ and $T_1$, V1=Vref=0 volts and supply voltage V2 rises from 0 volts to 0.7 volts. Between times $T_1$ and $T_2$, V1 and Vref remain at 0 volts, and supply voltage V2 is at 0.7 volts. In FIG. 5, when V2 is at 0.7 volts, PMOS transistor P1 is off and PMOS transistor P2 is on. In this state, node 202 (i.e., Vint) is pulled up towards V2 (e.g., towards 0.7 volts), through PMOS transistor P2, and PMOS transistors P3 and P4 are in nonconductive, or off states.

Further in FIG. 5, as when Vint is at 0.7 volts, VGSs of PMOS transistors P5 and P6 are such that PMOS transistor P5 is off and PMOS transistor P6 is on. In this state, node 204 (i.e., Vout) is pulled up towards Vint (i.e., towards 0.7 volts), through PMOS transistor P6, and PMOS transistors P7 and P8 are in nonconductive, or off states.

In FIG. 6, between times $T_2$ and $T_3$, V1 rises towards 1.65 volts. Correspondingly, Vref rises towards 0.825 volts. In FIG. 5, as Vref rises towards 0.825 volts, PMOS transistor P2 turns off and PMOS transistor P1 turns on. As illustrated in FIG. 6, as PMOS transistor P2 turns off and PMOS transistor P1 turns on, node 202 (i.e., Vint) is pulled up towards Vref (e.g., towards 0.825 volts), through PMOS transistor P1, and PMOS transistors P3 and P4 are in nonconductive, or off states.

When supply voltages V1 and V2 are available (i.e., Vref is approximately equal to supply voltage V2), and where transistors P1, P2, P3, and P4 are thin-oxide transistors, Vint may settle or float to voltage between Vref and V1. This is because the difference between supply voltage V2 and Vref is less than a threshold voltage (Vth). For a thin-oxide transistor, Vth may be within a range of approximately 350 millivolts (mV) to 530 mV.

For example, where supply voltage V2 is at its maximum (i.e., V2=0.9 volts):

$$|V2-Vref|=|0.9\text{ volts}-0.825\text{ volts}|=0.125\text{ millivolts (mv)}.$$

As another example, where supply voltage V2 is at its minimum (I.e., V2=0.65 volts):

$$|V2-Vref|=|0.065\text{ volts}-0.825\text{ volts}|=0.175\text{ mv}.$$

Further in FIG. 5, as Vint rises towards 0.825 volts, PMOS transistor P6 turns off and PMOS transistor P5 turns on. As illustrated in FIG. 6, as PMOS transistor P6 turns off and PMOS transistor P5 turns on, node 204 (i.e., Vout) is pulled up from 0.7 volts towards V1 (i.e., towards 1.65 volts), through PMOS transistor P5, and PMOS transistors P7 and P8 are in nonconductive, or off states.

Voltages of the foregoing examples are provided in Table 2, below.

TABLE 2

| V1 | V2 | N-Well-Internal (i.e., Vint) | N-Well-Output (Vout) |
|---|---|---|---|
| 1.65 volts | 0 volts | 0.825 volts | 1.65 volts |
| 1.65 volts | 0.65 volts | floating, > Vref/V2 | 1.65 volts |
| 0 volts | 0.65 volts | 0.65 volts (V2) | 0.65 volts |

In the foregoing examples, voltages across terminals of PMOS transistors P1 through P8 do not exceed the example maximum recommended/allowed voltage across terminals of a thin-oxide PMOS transistor (i.e., 0.965 volts).

Example embodiments of reference voltage generator circuit 106 are provided below with reference to FIGS. 7, 8, and 9.

Figure 7:
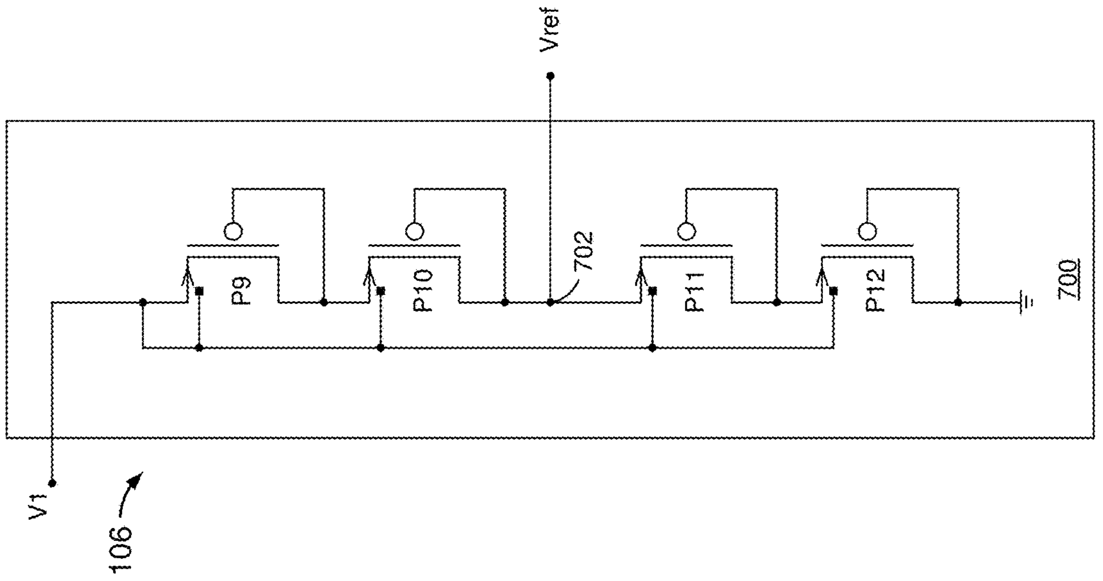
FIG. 7 is a schematic diagram of a reference voltage generator of the cascaded N-well voltage steering circuit, including a voltage divider circuit that includes series-coupled thin-oxide PMOS transistors, according to an embodiment.

FIG. 7 is a schematic diagram of reference voltage generator circuit 106 including a voltage divider circuit 700 that includes series-coupled PMOS transistors P9 through P12, and a tap 702 that provides Vref based on V1, according to an embodiment. Where tap 702 is positioned at a midpoint of voltage divider circuit 700, as illustrated in FIG. 7, and where PMOS transistors P9 through P12 are substantially identical to one another, Vref=½ V1. Voltage divider circuit 700 may include more than four PMOS transistors, fewer than four PMOS transistors, PMOS transistors with different features/characteristics, and/or additional circuitry. Other arrangements of voltage divider circuit 700 may provide Vref as less than or greater than ½ V1. PMOS transistors P9 through P12 may include thin-oxide PMOS transistors, and may be diode-connected as illustrated in FIG. 7.

Figure 8:
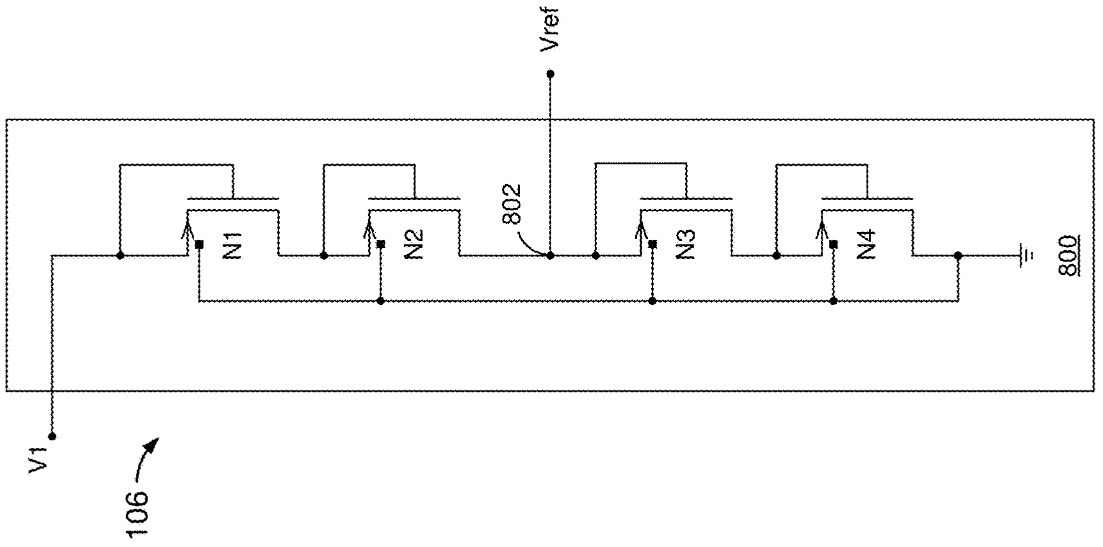
FIG. 8 is a schematic diagram of the reference voltage generator including series-coupled thin-oxide NMOS transistors, according to an embodiment.

FIG. 8 is a schematic diagram of reference voltage generator circuit 106 including a voltage divider circuit 800 that includes series-coupled NMOS transistors N1 through N4, and a tap 802 that provides Vref based on V1, according to an embodiment. Where tap 802 is positioned at a midpoint of voltage divider circuit 800, as illustrated in FIG. 8, and where NMOS transistors N1 through N4 are substantially identical to one another. Vref=½ V1. Voltage divider circuit 800 may include more than four NMOS transistors, fewer than four NMOS transistors, NMOS transistors with different features/characteristics, and/or additional circuitry. Other arrangements of voltage divider circuit 800 may provide Vref as less than or greater than ½ V1. NMOS transistors N1 through N4 may include thin-oxide NMOS transistors, and may be diode-connected as illustrated in FIG. 8.

Figure 9:
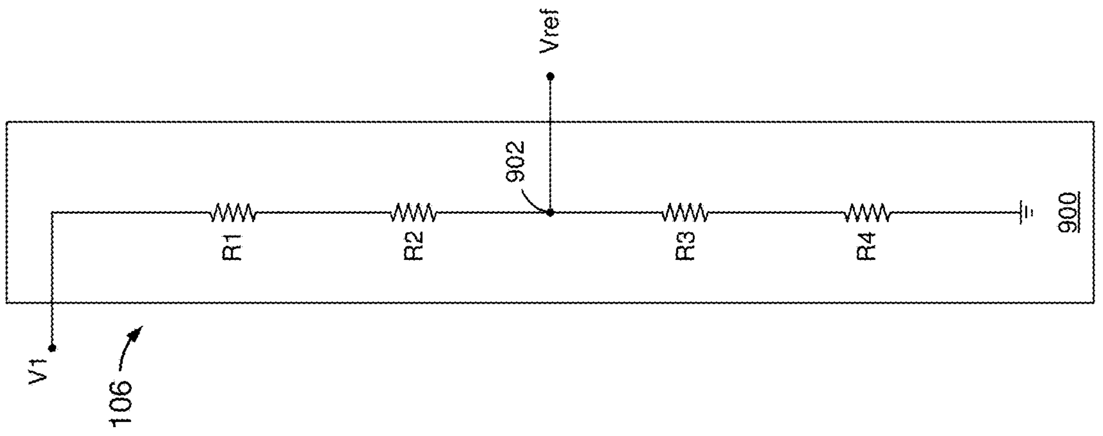
FIG. 9 is a schematic diagram of the reference voltage generator including series-coupled resistors, according to an embodiment.

FIG. 9 is a schematic diagram of reference voltage generator circuit 106 including a voltage divider circuit 900 that includes series-coupled resistors R1 through R4 (i.e., a resistor ladder), and a tap 902 that provides Vref based on V1, according to an embodiment. Where tap 902 is positioned at a midpoint of voltage divider circuit 900, as illustrated in FIG. 9, and where resistors R1 through R4 are substantially identical to one another, Vref=½ V1. Voltage divider circuit 900 may include more than four resistors, fewer than four resistors, resistors with different resistances, and/or additional circuitry. Other arrangements of voltage divider circuit 900 may provide Vref as less than or greater than ½ V1. Resistors R1 through R4 may be fabricated with a thin-oxide process.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) device, comprising:

a voltage divider circuit configured to output a reference voltage based on a first supply voltage;

a first voltage steering circuit configured to output a higher available one of the reference voltage and a second supply voltage as an interim voltage; and a second voltage steering circuit configured out output a higher available one of the first supply voltage and the interim voltage at an output of the second voltage steering circuit.

2. The IC device of claim 1, wherein the first and second voltage steering circuits comprise P-type metal oxide semiconductor (PMOS) transistors, and wherein the PMOS transistors comprise one or more thin-oxide PMOS transistors.

3. The IC device of claim 2, wherein the PMOS transistors consist substantially of thin-oxide PMOS transistors.

4. The IC device of claim 2, wherein the one or more thin-oxide PMOS transistors are designed for a supply voltage within a range of 0.65 volts to 0.9 volts, and wherein a manufacturer maximum recommended junction voltage of the one or more thin-oxide PMOS transistors is 0.965 volts.

5. The IC device of claim 2, wherein the one or more thin-oxide PMOS transistors are susceptible to an overvoltage when a junction voltage exceeds 0.965 volts.

6. The IC device of claim 2, wherein the reference voltage is greater than a difference between the first supply voltage and a maximum recommended junction voltage of the one or more thin-oxide PMOS transistors.

7. The IC device of claim 2, wherein:

a voltage difference between the first and second supply voltages exceeds a maximum recommended junction voltage of the one or more thin-oxide PMOS transistors;

a voltage difference between the second supply voltage and the reference voltage does not exceed the maximum recommended junction voltage; and a voltage difference between the first supply voltage and the interim voltage does not exceed maximum recommended junction voltage.

8. The IC device of claim 2, wherein:

the first supply voltage is within a range of 1.35 volts to 1.65 volts;

the reference voltage is within a range of 0.675 volts to 0.825 volts; and the second supply voltage is within a range of 0.65 volts to 0.9 volts.

9. The IC device of claim 2, wherein:
the output of the first voltage steering circuit is coupled to N-wells of the PMOS transistors of the first voltage steering circuit; and
the output of the second voltage steering circuit is coupled to N-wells of the PMOS transistors of the second voltage steering circuit.

10. The IC device of claim 9, further comprising functional circuitry, wherein the output of the second voltage steering circuit is further coupled to N-wells of PMOS transistors of the functional circuitry.

11. An integrated circuit (IC) device, comprising:
a cascaded N-well voltage steering circuit that comprises first and second inputs coupled to respective sources of first and second supply voltages, and P-type metal-oxide semiconductor (PMOS) transistors consisting substantially of thin-oxide PMOS transistors, wherein the cascaded N-well voltage steering circuit is configured to output a highest available one of the first and second supply voltages.

12. The IC device of claim 11, wherein the cascaded N-well voltage steering circuit comprises:
a voltage divider circuit configured to output a reference voltage based on a voltage at the first input;
a first voltage steering circuit comprising a first subset of the thin-oxide PMOS transistors configured to output a higher one of the reference voltage and a voltage at the second input at an interim voltage output of the first voltage steering circuit; and
a second voltage steering circuit comprising a second subset of the thin-oxide PMOS transistors configured to output a higher one of the voltage at the first input and a voltage at the interim voltage output of the first voltage steering circuit, at an output of the cascaded N-well voltage steering circuit.

13. The IC device of claim 12, wherein:
the interim voltage output of the first voltage steering circuit is coupled to N-wells of the first subset of PMOS transistors; and
the output of the cascaded N-well voltage steering circuit is coupled to N-wells of the second subset of PMOS transistors.

14. The IC device of claim 12, wherein:
the first supply voltage is within a range of 1.35 volts to 1.65 volts;
the reference voltage is within a range of 0.675 volts to 0.825 volts; and
the second supply voltage is within a range of 0.65 volts to 0.9 volts.

15. An integrated circuit (IC) device, comprising:
a voltage divider circuit comprising an input coupled to a source of a first supply voltage, and a reference voltage output;
a first voltage steering circuit comprising a reference voltage input coupled to the reference voltage output of the voltage divider circuit, and a second supply voltage input coupled to a source of a second supply voltage, wherein the first voltage steering circuit is configured to output a highest one of a voltage at the reference voltage input and a voltage at the second supply voltage input at an interim voltage output; and
a second voltage steering circuit comprising a first supply voltage input coupled to the source of the first supply voltage, and an interim voltage input coupled to the interim voltage output of the first voltage steering circuit, wherein the second voltage steering circuit is configured to output a highest one of a voltage at the first supply voltage input and a voltage at the interim voltage input.

16. The IC device of claim 15, wherein the first voltage steering circuit further comprises:
a first thin-oxide p-type metal-oxide semiconductor (PMOS) transistor comprising a gate coupled to the second supply voltage input, a source coupled to the reference voltage input, and a drain coupled to the interim voltage output; and
a second thin-oxide PMOS transistor comprising a gate coupled to the reference voltage input, a drain coupled to the second supply voltage input, and a source coupled to the interim voltage output; and
wherein the interim voltage output is coupled to N-wells of the first and second thin-oxide PMOS transistors.

17. The IC device of claim 16, wherein the first voltage steering circuit further comprises:
a third thin-oxide PMOS transistor having a gate and a source coupled to the reference voltage input, and a drain coupled to the interim voltage output; and
a fourth thin-oxide PMOS transistor having a gate and a source coupled to the interim voltage output, and a drain coupled to the second supply voltage input; and
wherein the interim voltage output is further coupled to N-wells of the second and third thin-oxide PMOS transistors.

18. The IC device of claim 17, wherein the second voltage steering circuit further comprises:
a fifth thin-oxide PMOS transistor comprising a gate coupled to the interim voltage input, a source coupled to the first supply voltage input, and a drain coupled to an output of the second voltage steering circuit; and
a sixth thin-oxide PMOS transistor comprising a gate coupled to the first supply voltage input, a drain coupled to the interim voltage input, and a source coupled to the output of the second voltage steering circuit; and
wherein the output of the second voltage steering circuit is coupled to N-wells of the fifth and sixth thin-oxide PMOS transistors.

19. The IC device of claim 18, wherein the second voltage steering circuit further comprises:
a seventh thin-oxide PMOS transistor having a gate and a drain coupled to the output of the second voltage steering circuit, and a source coupled to the first supply voltage input; and
an eighth thin-oxide PMOS transistor having a gate and a source coupled to the output of the second voltage steering circuit, and a drain coupled to the interim voltage input; and
wherein the output of the second voltage steering circuit is further coupled to N-wells of the seventh and eighth thin-oxide PMOS transistors.

20. The IC device of claim 15, wherein the voltage divider circuit comprises one or more of:
series-coupled, thin-oxide PMOS transistors;
series-coupled, thin-oxide NMOS transistors; and
series-coupled resistors.

* * * * *